Oct. 27, 1964 P. J. CALIFANO 3,153,875
UNDERWATER SPEAR GUN
Filed Aug. 21, 1961 6 Sheets-Sheet 1

Paul J. Califano
INVENTOR.

BY Clarence A. O'Brien
and Harvey B. Jacobson
Attorneys

Oct. 27, 1964  P. J. CALIFANO  3,153,875
UNDERWATER SPEAR GUN
Filed Aug. 21, 1961  6 Sheets-Sheet 5

Paul J. Califano
INVENTOR.

United States Patent Office 3,153,875
Patented Oct. 27, 1964

3,153,875
UNDERWATER SPEAR GUN
Paul J. Califano, Orange Park, Fla.
(4591 St. Johns Ave., Jacksonville 10, Fla.)
Filed Aug. 21, 1961, Ser. No. 132,862
23 Claims. (Cl. 43—6)

This invention relates to an underwater spear gun and more specifically to an underwater spear gun for initially propelling spears utilized to stun or kill various types of fish.

The main object of this invention is to provide a spear gun including means for propelling a spear from a gun of the type which, after once being provided, will require little or no further attention and which will enable the gun to be fired repeatedly without reloading the gun. Most types of underwater spear guns are provided with barrel portions having pistons disposed therein with the barrels being open at the forward end and closed at the rear end and there being provided a fluid pressure chamber in communication with the rear end of the barrel in order that fluid pressure may be utilized to project a spear from the spear gun. In addition, some types of spear guns utilize a barrel member which is open at the forward end and closed at the rear end and having a fluid pressure chamber in communication with the rear end of the barrel. This type of spear gun utilizes a spear having a piston head on the rear end thereof whereby the piston head may be disposed at the rear end of the barrel of the spear gun in order that a valved control means for communicating the rear end of the barrel with the pressure chamber may be opened thereby propelling the spear from the barrel by means of the fluid pressure communicated with the rear end of the barrel.

A further object of this invention, in accordance with the preceding object, is to provide an underwater spear provided with an impact head on the forward end thereof and a spear gun capable of projecting the spear with such force through the water that the impact head itself may be utilized to kill fish without the head of the spear penetrating the fish.

Still another object of this invention is to provide a spear gun having a drag member releasably secured thereto and provided with a bridle line adapted to be secured to a spear before the spear is projected from the spear gun whereby a fish having a penetrating spear head of the spear engaged therewith will tow the drag member through the water which may be provided with sufficient frontal area in the direction of movement of the fish to quickly tire the latter in the event the spear head engaged therewith did not hit a vital spot.

Still another object of this invention, in accordance with the immediately preceding object, is to provide a drag member for tiring speared fish which is provided with plane means coacting with the drag member and the bridle line secured thereto for effecting forward and upward movement of the drag member through the water upon a forward and downward pull being applied to the bridle line and for effecting a forward and downward movement of the drag member upon a forward and upward pull being effected on the bridle line.

Yet another object of this invention is to provide a spear gun provided with means for effecting a two stage forward thrust on a spear being propelled therefrom with the first thrust including an initial high value thrust and the subsequent thrust including a lower value thrust in order that the inertia of the spear at rest may be readily overcome by the initial high value thrust and the subsequent lower value thrust may be utilized to increase the speed of the spear as it is being propelled from the spear gun.

Another object of this invention, in accordance with the immediately preceding object is to provide a spear gun having a barrel member with a longitudinal bore formed therein opening through the forward end of the barrel member and having a piston member snugly reciprocal in the bore for engagement with the rear end of the spear being propelled from the gun and with the spear gun being provided with means coacting with the piston and the forward end of the barrel for sealing the forward end of the bore upon movement of the rear end of the spear outwardly of the bore.

Yet another object of this invention, in accordance with the immediately preceding object is to provide a means for cushioning the stopping of the forward movement of the piston member in the bore as it approaches the forward end of the latter.

Another object of this invention is to provide a spear gun having a barrel member with a piston member reciprocal therein and means for applying constant fluid pressure between the piston member and the rear end of the bore together with jack means for jacking a spear shaft rearwardly into the barrel member with the rear end of the spear shaft engaged with the forward face of the piston member in order that the piston member may be urged rearwardly in the barrel member.

A further object of this invention, in accordance with the immediately preceding object is to provide the jacking means with trigger release means whereby the jacking means may be released from engagement with the spear shaft in order that the fluid pressure behind the piston member may urge the spear shaft outwardly of the forward end of the barrel member.

Yet another object of this invention is to provide means on the forward end of the spear gun for releasably engaging and supporting the intermediate portion of a bridle line between the opposite ends thereof in a neat and coiled state in order that one end of the bridle line may be secured to a spear and the other end of the bridle line may be secured to a portion of the spear gun.

A still further object of this invention is to provide a spear gun which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings and to FIGURES 1-8 in particular, there will be seen a spear gun generally referred to by the reference numeral 10. The spear gun 10 includes an elongated barrel member generally referred to by the reference numeral 12 having a longitudinal bore 14 formed therethrough. A female fitting generally referred to by the reference numeral 16 is threadedly engaged with the rear end of the barrel member 12 and extends rearwardly of the latter to receive a male fitting generally referred to by the reference numeral 18. The male fitting 18 is threadedly engaged in the rear end of the female fitting 16 and has a longitudinal bore 20 formed therethrough. The forward end of the male fitting has a longitudinally extending tubular shank portion 22 extending forwardly therefrom whose interior is in communication with the bore 20. The forward end of the shank portion 22 is provided with a diametrically enlarged abutment head 24 for a purpose to be more fully set forth hereinafter. The rear end of the longitudinal bore 20 is provided with a threaded counter bore 26 and a male nipple 28 is threadedly engaged therein. The nipple 28 is secured to and communicates with the interior of a fluid pressure chamber member generally referred to by reference numeral 30 which is elongated and has the male nipple 28 projecting forwardly from its forward end. The rear end of the pressure chamber member 30 is provided with a threaded mounting stud 32 to which a disk-shaped resilient skid pad 34 is secured by means of a fastener 36. The female fitting 16 has an inlet neck assembly generally referred to by reference numeral 38 secured thereto at one end. The free end of the inlet neck assembly 38 is provided with internal threads 40 and a charging valve assembly generally referred to by the reference numeral 42 has an externally threaded shank portion 44 threadedly engaged in the free end of the inlet neck assembly 38. The charging valve assembly may be connected to any suitable source of compressed air in order to admit air under pressure to the interior of the fluid pressure chamber member 30 by means of the radial bores 46 and 48 formed in the female fittings 16 and the barrel member 12. From FIGURE 2 of the drawings it may be observed that the bores 46 and 48 are registered with each other and that air admitted under pressure into the inlet neck assembly 38 may enter the barrel member 12 through the bores 46 and 48 and then enter the fluid pressure chamber member 30 by means of the shank portion 22, the longitudinal bore 20 and the male nipple 28.

Figure 2:
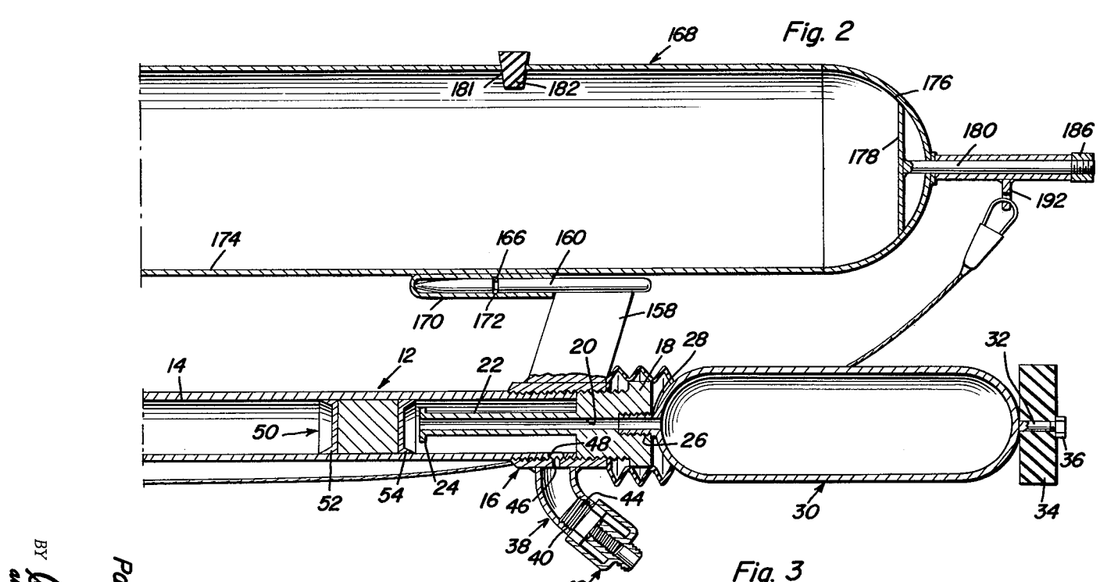
FIGURE 2 is a fragmentary longitudinal vertical sectional view of the rear end of the spear gun as illustrated in FIGURE 1.
Figure 3:
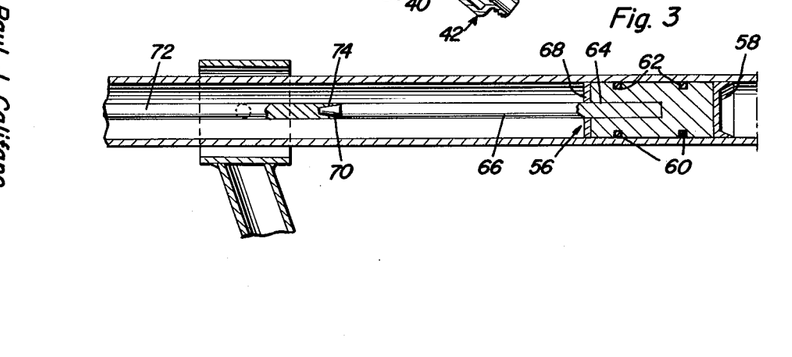
FIGURE 3 is a fragmentary longitudinal vertical sectional view of an intermediate portion of the spear gun on somewhat of an enlarged scale.

A piston seal member generally referred to by the reference numeral 50 is snugly and slidably disposed in the rear end of bore 14 and includes a pair of opposite end sealing cups 52 and 54. A piston or abutment thrust member generally referred by the reference numeral 56 is also snugly and slidably disposed in the bore 14 but forwardly of the piston seal member 50. The abutment thrust member 56 includes a rear sealing cup 58 and a pair of circumferential sealing rings 60 which are seated in circumferential grooves 62. The forward end of the abutment thrust member 56 has a longitudinal blind bore 64 formed therein and the rear end of a small diameter abutment shank 66 is secured in the blind bore 64. A resilient abutment washer 68 is disposed about the abutment shank 66 and is secured to the forward face of the abutment thrust member 56 in any convenient manner. The forward end of the abutment shank 66 is provided with a conical tip 70 and it will be noted that the rear end of the spear shaft 72 is provided with a complementary recess 74 which opens rearwardly and snugly receives the conical tip 70 of the abutment shank 66. Additionally, it will be noted that the spear shaft 72 and abutment shank 66 are substantially cylindrical and are of the same diameter.

Figure 4:
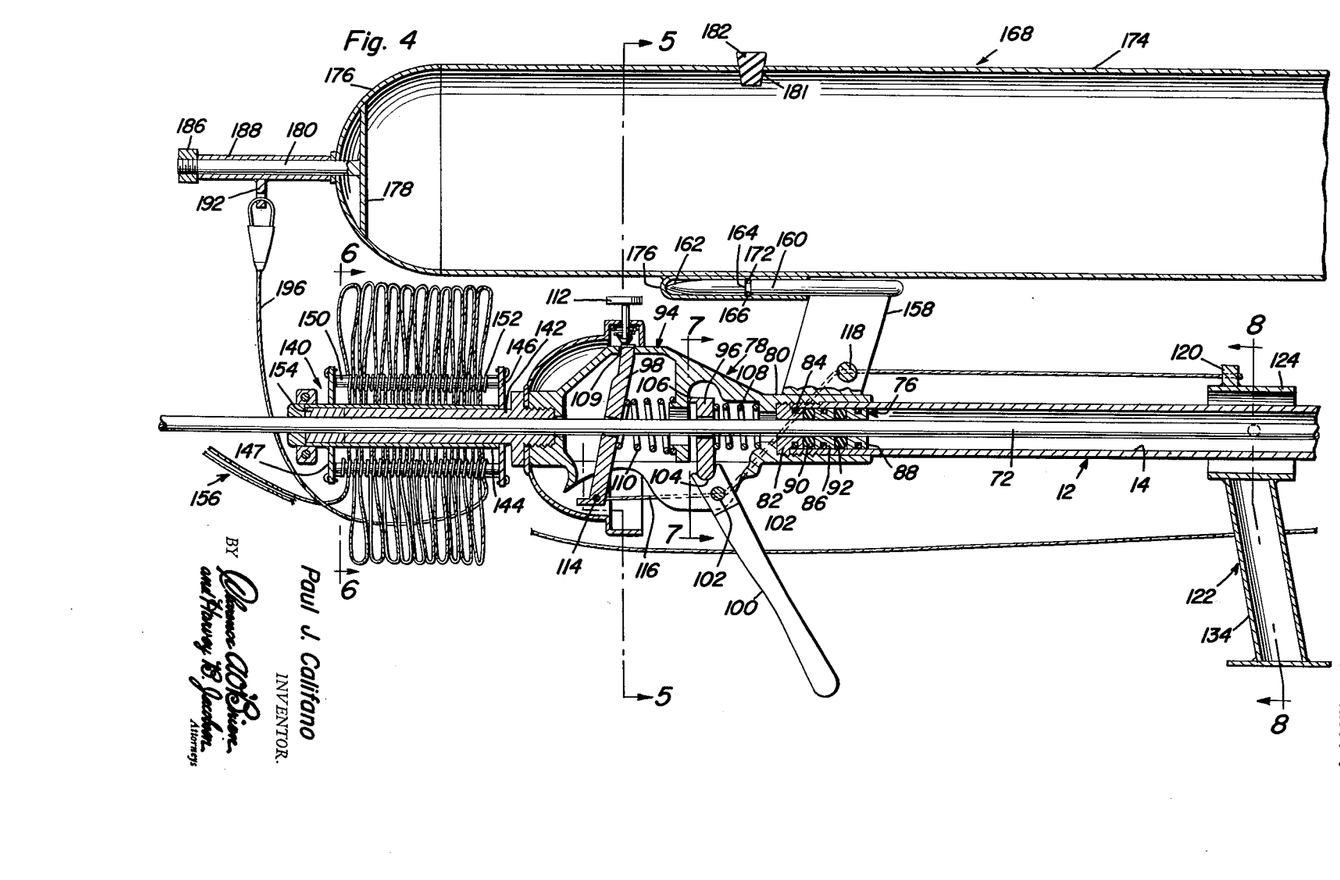
FIGURE 4 is a somewhat enlarged fragmentary longitudinal vertical sectional view of the forward end of the spear gun.

With attention now invited to FIGURE 4 in particular it will be noted that an abutment element assembly generally referred to by the reference numeral 76 is secured to the forward end of the barrel member 12 by means of a jacking and trigger release assembly generally referred to by the reference numeral 78. The jacking and trigger release assembly 78 includes a female fitting 80 in which the forward end of the barrel member 12 is threadedly engaged. It will be noted that the abutment element assembly includes a forward disk 82 having a circumferential annular and resilient seal 84 and is partially disposed in the forward end of the barrel member 12. Second and third sealing disks 86 and 88 are disposed totally within the bore 14 and a resilient sealing ring 90 is disposed between the front sealing disk 82 and the second sealing disk 86. A resilient sealing ring 92 is also disposed between the confronting surfaces of the second and third sealing disks 86 and 88 and it will be noted that each of the sealing disks 86 and 88 also includes a resilient seal similar to seal 84.

The jacking and trigger release assembly 78 includes a housing generally referred to by reference numeral 94 having an apertured jacking dog 96 and an apertured holding and releasing dog 98 loosely pivoted therein. A pivoted jacking lever 100 is pivotally secured to the housing 94 by means of pivot pin 102 and has its inner end provided with a concave notch 104 for receiving one side of the jacking dog 96. The jacking dog 96 is provided with a fulcrum abutment 106 which engages the housing 94 and tends to pivot the lower end of the jacking dog 96 which is engaged with the jacking lever 100 in a clockwise direction as viewed in FIGURE 4 of the drawings by means of the compression spring 108. The holding and releasing dog is loosely pivoted as at 109 and the lower end of the dog 98 is urged forwardly by means of compression spring 110. The jacking lever 100 serves to retain the jacking dog 96 in position within the housing 94 and the spring mounted guide pin 112 may be utilized to properly align the holding and releasing dog 98. The lower end of the holding and releasing dog 98 is apertured as at 114 and the mid-portion of a trigger release line 116 passes through the aperture 114 with the two free ends of the trigger release line 116 passing rearwardly through the opposite ends of the pivot pin 102 and then upwardly through the opposite ends of a transversely extending guide pin 118. The ends of the trigger release line 116 are secured together and looped about a lug 120 carried by the upper end of the trigger release grip which is generally referred to by the reference numeral 122. The trigger release grip includes a sleeve portion 124 which loosely receives the barrel member 12 and is pivotally secured to the latter by means of pivot fasteners 126 and 128 secured in mounting lugs 130 and 132 carried by the barrel member 12, see FIGURE 8. The lower end of the trigger grip 122 includes a grip portion 134 and it will be noted that by pivoting the lower end of the grip portion 134 forwardly the lug 120 will effect a rearward pull on the trigger release line 116 in order to effect rearward movement of the lower end of the holding and releasing dog 98 whereby the spear shaft 72 will be released in order to enable the fluid pressure between the abutment thrust member and seal member 50 and within the fluid pressure chamber member 30 to urge the abutment thrust member 56 forwardly in order to propel the spear shaft 72 from the forward end of the gun 10.

It will be noted that the abutment shank 66 extends a considerable distance forwardly of the abutment thrust member 56 and that as the spear shaft 72 passes through the abutment element assembly 76 the forward end of the abutment shank 66 will also pass through the abutment element assembly 76. The movement of the forward end of the abutment shank 66 into the abutment element assembly 76 will seal the forward end of the barrel member 12 and subsequent forward movement of the abutment thrust member 56 will compress the air disposed between the abutment element assembly 76 and the abutment thrust member 56 whereby the stopping of rapid forward movement of the abutment thrust member 56 will be cushioned. In this manner, no shock occurs upon the forward end face of the abutment thrust member 56 coming to rest against the rear end face of the sealing disk 88. As the abutment shank 66 enters the abutment element assembly 76, the entrance of water into the barrel member 12 is prevented by means of the fluid tight sealing engagement of the abutment element assembly with the valve member 12 and with the abutment shank 66.

A bridle holding and releasing assembly generally referred to by the reference numeral 140 is secured to the forward end of the housing 94 and includes an elongated tubular mounting shank 142. The tubular mounting shank 142 is in alignment with the bore 14 and an outer sleeve member 144 is slidingly disposed over the forward end of the mounting shank 142. An apertured disk 146 is fixedly secured to the mounting sleeve 142 and an apertured mounting disk 147 is fixedly secured to the sleeve member 144. A plurality of outer sleeve members 150 extend rearwardly from the apertured disk 147 and a plurality of circumferentially disposed rods 148 project forwardly of the apertured disk 146 and are telescopingly disposed within the sleeves 150. A plurality of expansion springs 152 are disposed about the sleeves 150 and one end of each spring 152 is engaged with the apertured disk 146 and the other end of the spring 152 is engaged with the apertured disk 147. A friction sleeve 154 is secured within the outer end of the sleeve member 144 and it will be noted that the mid-portion of the bridle member assembly generally referred to by the reference numeral 156 may be neatly coiled with convolutions of each coil received between adjacent convolutions of selected ones of the springs 152 whereby the mid-portion of the bridle member assembly 156 may be releasably supported in a neat and coiled state. Upon movement of the spear shaft 72 through the friction sleeve 154, the apertured disk 148 is urged outwardly and forwardly of the gun 110 which stretches the expansion spring 152 thereby releasing the portions of the bridle member assembly 156 frictionally supported between adjacent convolutions of some of the springs 152.

Figure 1:
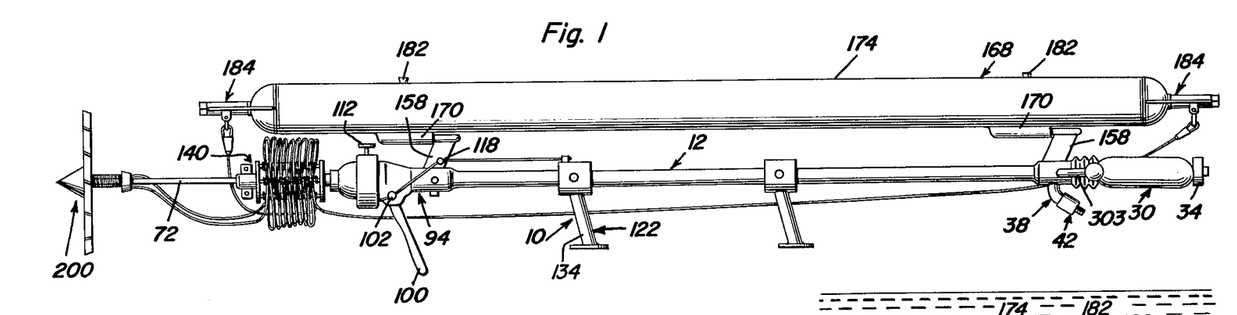
FIGURE 1 is a side elevational view of the spear gun shown with a spear disposed in the barrel of the spear gun, a detachable buoyant drag member secured to the top of the spear gun and a bridle line secured between the head of the spear and the buoyant drag member with the intermediate portion of the bridle line supported on the forward end of a spear gun in a neat and coiled state.

The housing 94 includes a support standard 158 provided with an elongated and longitudinally extending shank 160 which is pointed as at 162 on its forward end and is provided with a circumferential groove 164 in which a detent ring 166 is disposed. The female fitting 16 also includes a support standard 158 and a shank 160 provided with a detent ring 166. An elongated buoyant drag member generally referred to by reference numeral 168 is releasably mounted atop the spear gun 10 by means of cylindrical and rearwardly opening pockets 170 in which the shanks 160 are received. The pockets 170 include circumferential grooves 172 in which the detent rings 166 may be seated. Accordingly, it may be noted that the buoyant drag member 168 may be disengaged from the support standards 158 by means of a forward pull on the buoyant drag member 168. The buoyant drag member 168 comprises a generally cylindrical tank 174 which is closed at opposite ends by means of hemispherical end walls 176. The hemispherical end walls are provided with bracing baffles 178 and a pivot shaft 180 has its inner end fixedly secured to each bracing baffle 178. The bracing baffle 178 is generally cylindrical in plan and seals the extreme end portion of the tank 174 through which the pivot shaft 88 extend from the interior of the center portion of the tank 174. The tank 174 includes a pair of outlet openings 181 in which plugs 182 are removably secured.

Figure 9:
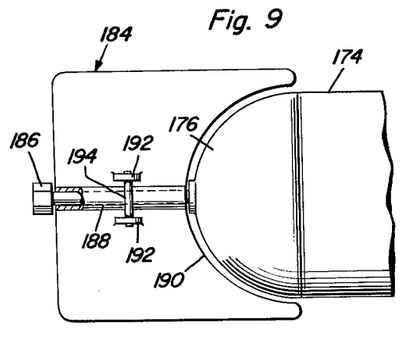
FIGURE 9 is a fragmentary enlarged top plan view of the forward end of the buoyant drag member.
Figure 10:
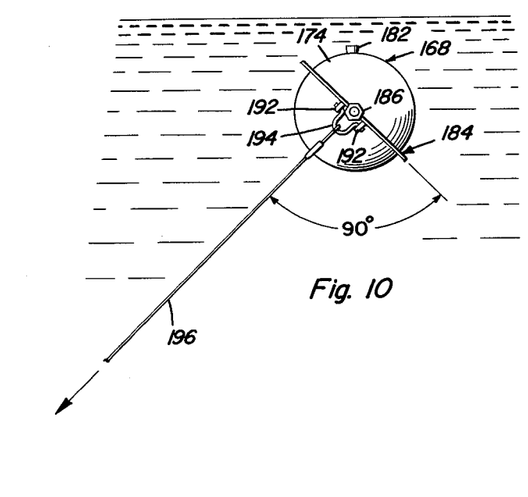
FIGURE 10 is an end elevational view of the buoyant drag member disposed in a body of water and illustrating the manner in which the movable planes carried by the buoyant drag member and connected to the bridle line may be utilized to quickly tire a speared fish.

With attention now directed to FIGURES 2, 9 and 10 of the drawings it will be noted that a plane member generally referred to by the reference numeral 184 is pivotally secured to each pivot shaft 180 by means of a retaining nut 186 which prevents the journal portion 188 of each planing member 184 from being withdrawn axially from the pivot shaft 180. The plane member 184 is substantially flat and it will be noted that the inner end of each plane member 184 is provided with a concave notch 190 for embracing the associated hemispheric end wall 176 of the tank 174. Laterally directed arm means in the form of a pair of apertured mounting lugs 192 interconnected by means of a U-shaped pivot pin 194 is carried by each of the plane members 184 and it may be observed from FIGURES 2 and 10 of the drawings that two free end portions of the bridle member assembly comprising a pair of bridle lines 196 are secured to the U-shaped pivot pins 194 at their rear ends. In this manner a forward pull on the bridle lines 196 will position the associated plane member 184 in a manner whereby it will lie in a plane extending at right angles to the movement of the bridle line 196. Accordingly, upon a forward and downward pull of the bridle line 196, the associated plane member 184 will be positioned so as to effect a forward and upward movement of the buoyant drag member 168. Further, if the bridle lines 196 are pulled forwardly and upwardly, the plane members 184 will be pivoted in order to effect a forward and downward movement of the buoyant drag member 168. In this manner a speared fish may be quickly tired and after the speared fish has stopped fighting the buoyancy of the drag member 168 will raise the latter to the surface of the body of the water in which it is disposed.

With attention now directed to FIGURES 11–17 of the drawings there will be seen a spear head assembly generally referred to by the reference numeral 200. The spear head assembly 200 is secured to the threaded forward end of the spear shaft 72 by means of an abutment head 202 which is provided with a threaded blind bore 204 in which the forward end of the spear shaft 72 is threadedly engaged. In addition, it will be noted that the abutment head 202 includes a substantially flat rear surface 206. An attaching collar generally referred to by the reference numeral 208 is secured to the shaft 72 by means of a setscrew 210 a spaced distance rearwardly of the abutment head 202 and a mounting disk generally referred to by the reference numeral 212 is slidably disposed on the shaft 72 between the attaching collar 208 and the abutment head 202. The mounting disk 212 is provided with a plurality of radially extending slots 214 and each of the slots is provided with a pair of confronting opposite side U-shaped grooves 216 which open through the forward face of the mounting disk 212 and terminate a spaced distance from the rear face of the mounting disk 212. A plurality of arm-like barbs 218 are apertured at their inner ends as at 220 and have their inner ends received in corresponding slots 214. A retaining ball 222 is disposed in each aperture 220 and is received between pairs of confronting grooves 216. In this manner, each of the barbs 218 is removably and pivotally secured to the mounting disk 212. A compression spring 224 is disposed between the confronting surfaces of the mounting disk 212 and the attaching collar 208 in order to resiliently urge the mounting disk 212 forwardly into engagement with the rear face 206 of the abutment head 202. It will be noted that each of the barbs 218 includes a flat forward edge 226 and that the inner end of the edges 226 is disposed in surface-to-surface abutting engagement with the rear face of the abutment head 202. As the spear head assembly 200 strikes a fish, if the abutment head 202 pierces the fish and the barbs 218 strike the fish, the impact of the barbs 218 striking the fish will in most cases kill the fish. However, if the flesh of the fish is soft and the spear head assembly 200 penetrates the fish with little resistance, the impact of the barbs 218 when in the extended position with the fish will tend to pivot the free ends of the barbs 218 rearwardly which will cam the mounting disk 212 rearwardly. Then, as the barbs 218 penetrate the fish, the free ends of the barbs which are beveled as at 228 will prevent withdrawal of the spear head assembly from the fish inasmuch as the barbs 218 will again be pivoted to the extended position shown in solid lines in FIGURE 11 as the spear head assembly 200 is moved rearwardly through the fish.

Figures 11, 12, 13, 14, 15, 16, 17:
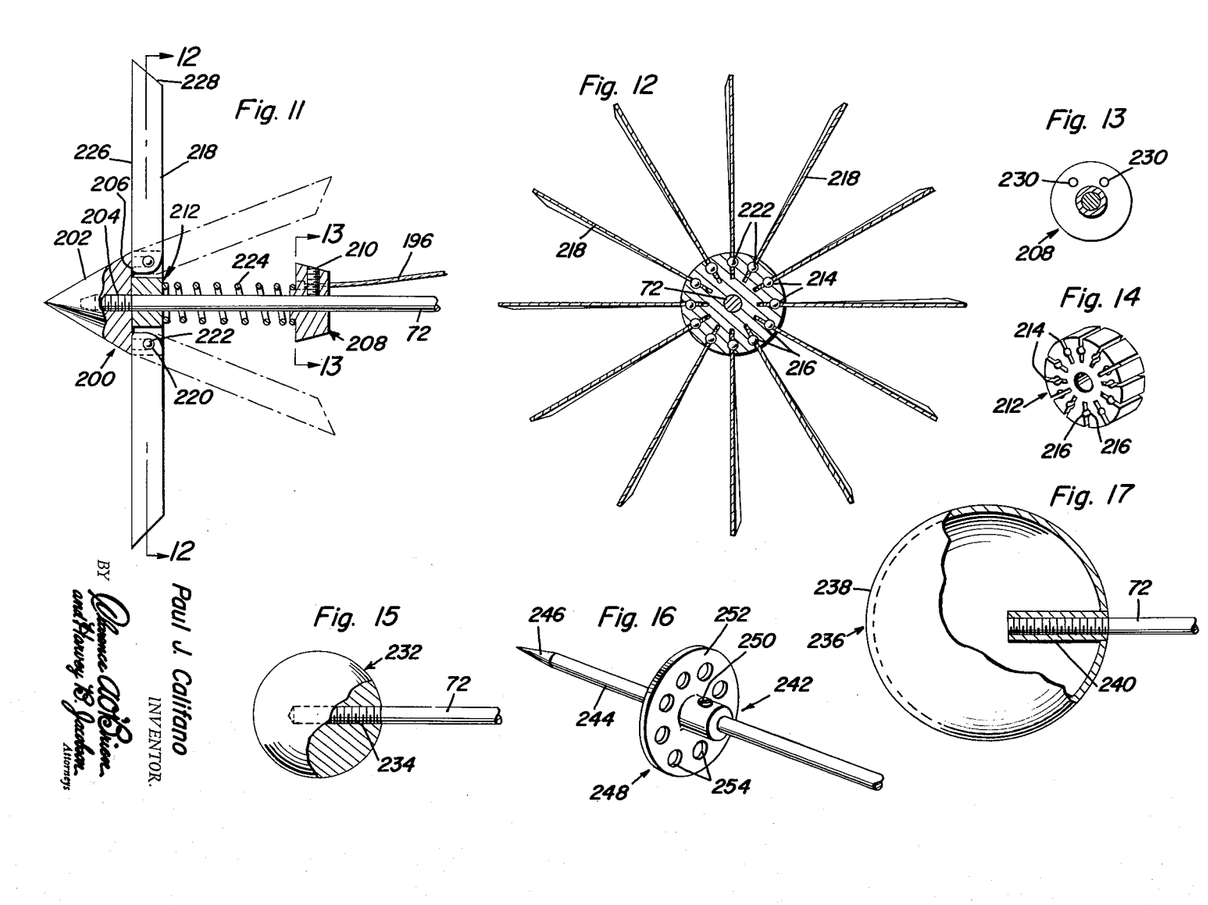
FIGURE 11 is a longitudinal vertical sectional view of the forward end of the spear illustrated in FIGURE 1 and on somewhat of an enlarged scale with movable portions of the spear head being shown in alternate positions by means of phantom lines.
FIGURE 12 is a vertical transverse sectional view taken substantially upon the plane indicated by section line 12—12 of FIGURE 11.
FIGURE 13 is a vertical transverse sectional view taken substantially upon the plane indicated by section line 13—13 of FIGURE 11.
FIGURE 14 is a perspective view of a portion of the spear head illustrated in FIGURE 11.
FIGURE 15 is a side elevational view of the forward end of a modified form of spear, parts of the spear head being broken away and shown in section.
FIGURE 16 is a perspective view of a still further modified form of spear.
FIGURE 17 is a side elevational view of yet another modified form of spear, parts thereof being broken away and shown in section.

It will be noted that the attaching collar 208 is provided with a pair of apertures 230 by which the forward ends of the bridle lines 196 are secured to the attaching collar 208 and thus to the spear shaft 72.

With attention now directed to FIGURE 15 of the drawings there will be seen a modified form of spear head assembly which is a solid spherical member generally referred to by the reference numeral 232. The spherical member 232 is provided with a threaded blind bore 234 in which the forward end of the shaft 72 may be threadedly engaged.

With attention now directed to FIGURE 17 of the drawings, there will be seen a still further modified form of spear head assembly generally referred to by the reference numeral 236 which is in the form of a hollow spherical member 238 being provided with an internally threaded sleeve 240 which communicates with the exterior of the spear 238. The internally threaded sleeve 240 is threadedly engaged with the forward end of the spear shaft 72.

With attention now directed to FIGURE 16 of the drawings, there will be seen a modified form of spear head assembly generally referred to by the reference numeral 242 which includes a modified form of spear shaft 244 provided with a conical point 246 on its forward end. An impact collar generally referred to by the reference numeral 248 slidably receives the spear shaft 244 and may be secured in adjusted position along the latter by means of a setscrew 250. The impact collar 248 includes a diametrically enlarged radially extending apertured flange 252. As the spear shaft 244 penetrates the fish, the apertured flange 252 will strike the fish and kill the fish by the impact of the flange 252 striking the fish. It will be noted that the apertures 254 formed in the flange 252 are to reduce the frictional drag of the impact collar 248 through the water.

With attention now directed to FIGURES 18–21 there will be seen a still further modified form of spear generally referred to by the reference numeral 256. The spear 256 includes a spear shaft 258 on which an attaching collar 260 may be adjustably positioned by means of a setscrew 262 and to which the forward ends of the bridle lines 196 may be secured.

Figures 18, 19, 20:
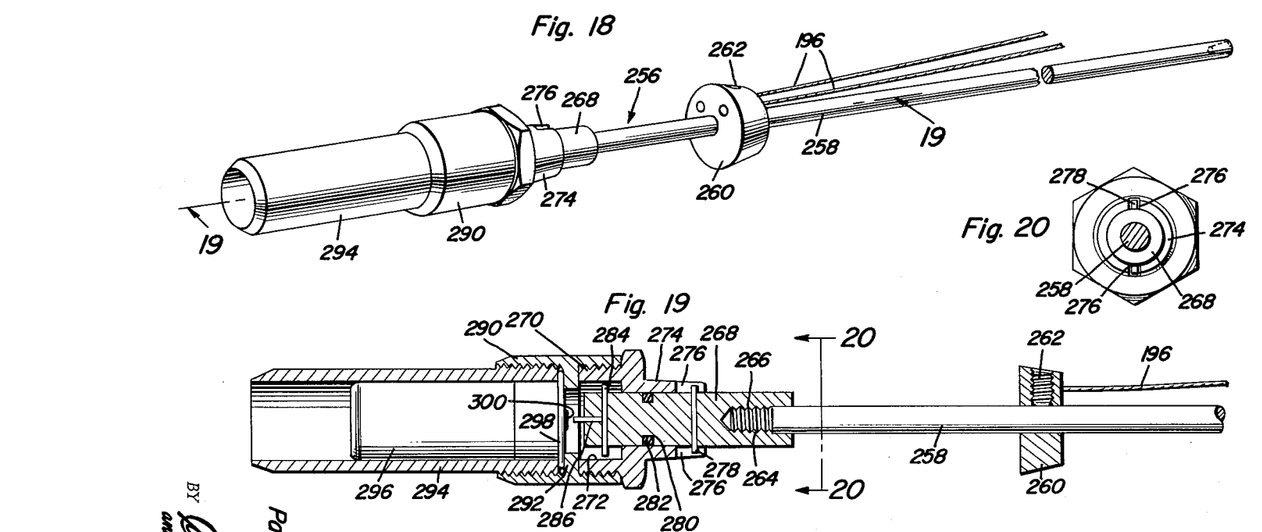
FIGURE 18 is a perspective view of a still further modification of spear head.
FIGURE 19 is a vertical longitudinal sectional view on somewhat of an enlarged scale taken substantially upon the plane indicated by section line 19—19 of FIGURE 18.
FIGURE 20 is a vertical transverse sectional view taken substantially upon the plane indicated by section line 20—20 of FIGURE 19.
Figure 21:
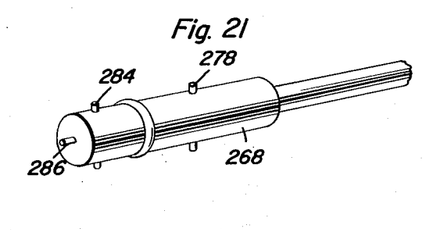
FIGURE 21 is a perspective view of the firing pin mechanism of the spear head illustrated in FIGURES 18-20.
Figure 22:
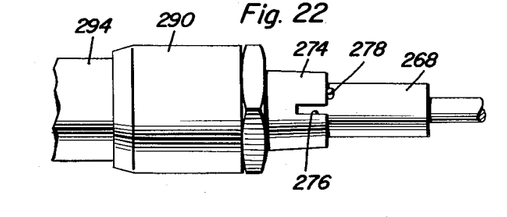
FIGURE 22 is a fragmentary side elevational view of the spear head illustrated in FIGURES 18-21 with the safety therefor in the on position.

The forward end of the spear shaft 258 is externally threaded as at 264 and is threaded engaged in a blind bore 266 formed in the rear end of a firing pin slide 268. A mounting collar having an externally threaded shank portion 270 and a counterbore 272 formed in the shank portion 270 is slidably disposed on the firing pin slide 268 and the mounting collar 274 is provided with diametric slots 276 in its rear end in which the opposite ends of a safety pin carried by the firing pin slide 268 are slidably received. The firing pin slide includes a circumferential groove 280 in which there is disposed a resilient O-ring seal 282 which also acts as a friction element between the firing pin slide 268 and the mounting collar 274. The firing pin slide 268 also includes a transversely extending retaining pin 284 which is disposed within the counterbore 272. The forward end of the firing pin slide 268 is provided with a forwardly projecting firing pin 286 and the mounting collar has one end of a mounting sleeve 290 threadedly engaged with the threaded shank portion 270. The mounting sleeve 270 includes an inwardly directed annular abutment flange 292 and a barrel member 294 is threadedly engaged in the forward end of the mounting sleeve 290. It will be noted that a shotgun shell 296 may have its rim 298 held captive between the confronting surfaces of the rear end of the barrel member 294 and the abutment flange 292. In this manner, the primer 300 of the shotgun shell 296 is axially aligned with the firing pin 286. If it is desired, the firing pin slide 268 may be withdrawn rearwardly from the mounting collar 274 an amount sufficient to place the safety pin 278 rearwardly of the rear end of the mounting collar 274 whereby the firing pin slide 268 may then be rotated as illustrated in FIGURE 22 of the drawings to move the safety pin 278 out of registry with the slots 276. In this manner, accidental impact on the forward end of the barrel member 94 will not discharge the shotgun shell 296. However, when the safety pin 278 is disposed within the slots 276, a sharp impact on the forward end of the barrel member 294 will cause rearward movement of the primer 300 relative to the firing pin 86 which, upon the striking of the primer 300 with the firing pin 286, will result in the shotgun shell 296 being discharged. It will be noted that the spear 256 may be constructed to use different size shotgun shells and that the spear shaft 258 could be used as a hand spear.

In operation, and assuming that the spear gun 10 is assembled as illustrated in FIGURE 1 of the drawings, upon forward swinging movement of the lower end of the grip portion 134 the trigger release line 116 will pull the lower end of the holding and releasing dog 98 rearwardly. The spear shaft 72 will be released and the high pressure disposed between the piston sealing member 50 and the abutment thrust member 56 will cause the latter to move sharply forwardly in order to propel the spear shaft 72 from the forward end of the barrel member 12. After initial movement of the abutment thrust member forwardly, the piston sealing member 50 will also move forwardly and the spear shaft 72 will be propelled the remainder of the distance from the barrel member 12 by means of the pressure within the fluid pressure member 30. As the rear end of the spear shaft 72 passes through the abutment element assembly 76, the forward end of the abutment shaft 60 will enter the abutment element assembly 76 to seal the forward end of the barrel member 12 to prevent the entrance of water thereinto. In addition, the sealing of the barrel member 12 between the abutment element assembly and the abutment thrust member 56 will cause an increase of pressure between the abutment thrust member and the abutment element assembly upon further forward movement of the abutment thrust member 56. This increase in pressure will gently cushion the retarding of forward movement of the abutment thrust member.

As the spear shaft 72 passes through the friction sleeve 154, the apertured disk 148 together with the sleeve member 144 will be pulled forwardly against the tension of the expansion springs 150 whereby the expansion springs 150 will be stretched in order to increase the distance between adjacent convolutions thereof. Accordingly, the portions of the bridle member assembly 156 disposed between adjacent convolutions of the springs 150 will be released whereupon substantially all of the drag on the spear shaft 72 will be eliminated. As the bridle member assembly 156 becomes taut, the rear ends of the bridle lines 196 will pull the buoyant drag member 168 from engagement with the supporting standards 158. The buoyant drag member 168 is constructed in a manner whereby its forward movement through the water will effect lateral swinging movement of the forward end of the buoyant drag member 168 whereby the drag member 168 will extend transversely above the direction of movement of the bridle member assembly 156. Then, as soon as the buoyant drag member 168 is disposed transversely of the movement of the spear shaft 72 and the bridle lines 196 become taut, the plane members 184 will be rotated to a position extending substantially at right angles to the direction of movement of the bridle lines 196 whereby downward movement of a fish with which the spear shaft 72 is engaged will effect upward movement of the buoyant drag member 168 and upward movement of the speared fish will cause downward movement of the buoyant drag member 168.

The charging valve assembly 142 may be utilized to initially place a charge of compressed fluid within the fluid pressure member 30 and it will be noted that the connection between the fluid pressure member 30 and the barrel member 12 is enclosed by means of a resilient boot, see FIGURE 2.

The spear gun 10 may be used effectively by filling the fluid pressure member 30 at any convenient source of compressed air such as a gasoline or filling station. However, the spear gun 10 is capable of handling much greater charges of compressed air than that available at most gasoline stations. However, once the fluid pressure member 30 has been provided with the desired charge of compressed air, it may be used over and over and again without recharging the fluid pressure member 30.

As the spear shaft 72 is jacked rearwardly into the barrel member 12, both the piston sealing member 50 and abutment thrust member 56 are urged rearwardly. As the piston seal member 50 reaches its rearwardmost limit established by the abutment head 24, the charge of compressed air disposed rearwardly of the piston member 50 has been substantially and entirely forced back into the fluid pressure chamber member 30. Accordingly, maximum pressure has been obtained in the fluid pressure chamber member 30. However, upon further movement of the spear shaft 72 rearwardly in the barrel member 12, the distance between the abutment thrust member 56 and the piston seal member 50 is reduced whereby the air disposed between the abutment thrust member 56 and the piston seal member 50 is compressed even more until such time as the desired rearward position of the spear shaft 72 in the barrel member 12 has been achieved. At this point, the pressure between the piston seal member and the abutment thrust member 56 could well be in the neighborhood of 5000 p.s.i. This extreme high pressure of course readily overcomes the inertia of the spear shaft 72 being at rest when the holding and releasing dog 98 releases the spear shaft 72 which results in the spear shaft 72 being sharply placed into speeding movement outwardly of the forward end of the barrel member 12. After initial movement of the abutment thrust member 56 relative to the piston seal member, the pressure in the areas between the piston seal member and the abutment thrust member 56 and rearwardly of the piston seal member 50 will be equalized whereby the larger volume of air pressure disposed in the fluid pressure chamber member 30 will continue to accelerate the spear shaft 72 as it moves outwardly of the forward end of the barrel member 12.

With reference to FIGURES 15–17, it is to be understood that each of the spears illustrated therein will be provided with a weighted attaching collar similar to attaching collar 260. Each of these attaching collars may be utilized to secure the bridle lines 196 to the spear shafts and also to provide additional momentum during flight of the spear in order that the impact head carried thereby may strike a fish with a greater impact.

Figures 5, 6, 7:
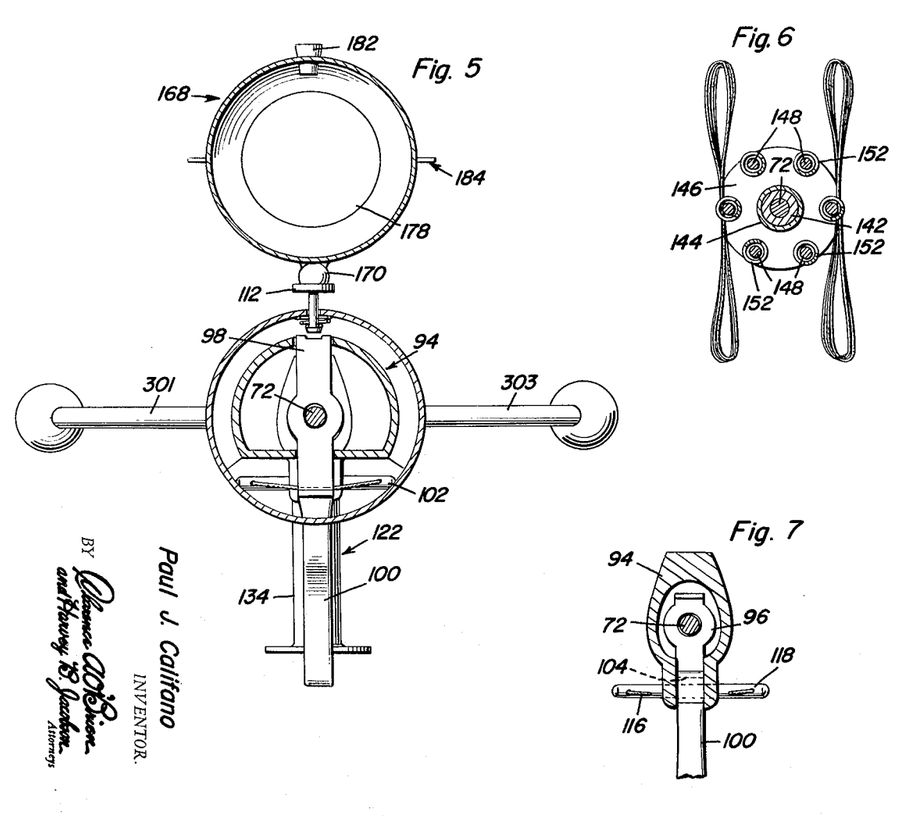
FIGURE 5 is a transverse vertical sectional view taken substantially upon the plane indicated by section line 5—5 of FIGURE 4.
FIGURE 6 is a transverse vertical sectional view taken substantially upon the plane indicated by section line 6—6 of FIGURE 4.
FIGURE 7 is a vertical transverse sectional view taken substantially upon the plane indicated by section line 7—7 of FIGURE 4.
Figure 8:
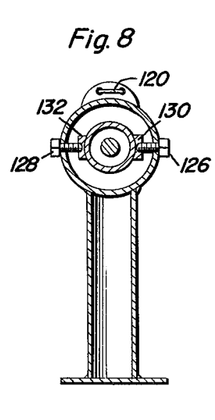
FIGURE 8 is a vertical transverse sectional view taken substantially upon the plane indicated by section line 8—8 of FIGURE 4.

Further, it will be noted from FIGURES 1 and 5 that the female fitting 16 includes a pair of opposite side grip arms 301 and 303 which project outwardly from opposite sides of the fitting 16 which may be used by the operator of the spear gun 10 for carrying the latter and for steadying the spear gun whenever the fluid chamber 30 is being re-charged.

Still further, and with attention directed to FIGURE 2 of the drawings, it is to be understood that a manually operable vent valve could be provided in the barrel member 12 at a point spaced slightly forwardly of the piston seal member 50 as positioned in FIGURE 2 of the drawings. This vent valve could be utilized to admit sufficient air into the barrel member 12 between the piston seal member and the abutment thrust member 56 when in a normal position whereby the pressure of the high pressure area between the piston seal member and the abutment thrust member 56 may be predetermined.

Still further, and with attention directed to FIGURE 4 of the drawings, the barrel member 12 may be provided with a manually operable vent valve immediately rearwardly of the abutment element assembly 76 in order that the forward portion of the barrel member 12 may be vented as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spear gun comprising an elongated barrel member having a longitudinal bore formed therein opening through at least the forward muzzle end of said barrel member, a piston snugly reciprocable in said bore including means on its forward end adapted to engage the rear end of an elongated projectile inserted rearwardly into the forward end of said bore, and yieldable propulsive means in said bore disposed rearwardly of said piston and including means for effecting a two stage forward thrust on said piston when released after being previously urged rearwardly in said bore, said two stage forward thrust including an initial high value thrust and a subsequent lower value thrust.

2. The combination of claim 1 wherein the forward end of said bore has a centrally apertured abutment element secured therein comprising a stop for the forward limit of the reciprocable movement of said piston.

3. The combination of claim 2 wherein said piston includes a centrally disposed and longitudinally extending small diameter shank projecting from the forward end thereof snugly and slidably receivable through said apertured abutment element in fluid sealing engagement therewith whereby as said piston is moved forwardly in said bore the forward end of said shank will seal the forward end of said bore and subsequent further forward movement of said piston will effect compression of the atmosphere disposed between said apertured abutment element and piston to cushion the stopping of forward movement of said piston.

4. In combination, an elongated barrel member having a longitudinal bore formed therein opening through at least the forward muzzle end of said barrel member, a piston reciprocable in said bore, yieldable thrust means disposed in said bore rearwardly of said piston effecting a forward thrust on said piston, a centrally apertured abutment element secured in the forward end of said bore, and a small diameter, centrally disposed and longitudinally extending shank projecting from the forward end of said piston snugly and slidably receivable through said apertured abutment element in fluid sealing engagement therewith whereby as said piston is moved forwardly in said bore the forward end of said shank will seal the forward end of said bore and subsequent further forward movement of said piston will effect compression of the atmosphere disposed between said abutment element and said piston for cushioning the stopping of forward movement of said piston.

5. In combination, an elongated barrel member having a longitudinal bore formed therein opening through at least the forward muzzle end of said barrel member, a piston reciprocable in said bore, yieldable thrust means disposed in said bore rearwardly of said piston effecting a forward thrust on said piston, a centrally apertured abutment element secured in the forward end of said bore, and sealing means operatively associated with said piston and abutment element for sealing the forward end of said bore upon forward movement of said piston in said bore to a point spaced rearwardly of but adjacent said abutment element whereby subsequent further forward movement of said piston will effect compression of the atmosphere disposed between said abutment element and said piston for cushioning the stopping of forward movement of said piston.

6. The combination of claim 1 including jack means carried by the forward end of said barrel and adapted to engage a spear shaft whose rear end is aligned with said bore and urge the spear shaft rearwardly into said bore whereby said piston may be urged rearwardly in said bore by means of said shaft.

7. The combination of claim 6 wherein said jack means includes trigger release means for effecting release of a spear shaft engaged thereby.

8. The combination of claim 1 wherein said yieldable two-stage propulsive means includes a piston seal member snugly reciprocable in said bore and disposed a spaced distance rearwardly of said abutment element, and a fluid pressure chamber carried by said barrel member and communicated with said bore rearwardly of the rearmost travel of said piston seal member in said bore whereby air under a given pressure may be introduced into said chamber and as said piston is moved rearwardly the pressure differential between the first area between said piston and said piston seal member and the second area between said piston seal member will effect rearward movement of the latter to its rearwardmost limit thereby establishing a maximum pressure behind said piston seal member and further rearward movement of said abutment element will effect a greater pressure between the latter and said piston seal member thereby enabling the pressure in said first area to effect a sharp high initial thrust to a projectile engaged with said abutment element and the pressure in said second area to effect a subsequent lower thrust to said projectible as the pressure in said areas are substantially equalized.

9. In combination, an elongated barrel member having a longitudinal bore formed therein and opening through at least the forward muzzle end of said barrel member, a piston reciprocable in said bore, yieldable thrust means disposed in said bore rearwardly of said piston effecting a forward thrust on said piston, a centrally apertured abutment element secured in the forward end of said bore, a small diameter, centrally disposed and longitudinally extending shank projecting from the forward end of said piston snugly and slidably receivable through said apertured abutment element in fluid sealing engagement therewith whereby as said piston is moved forwardly in said bore the forward end of said shank will seal the forward end of said bore and subsequent further forward movement of said piston will effect compression of the atmosphere disposed between said abutment element and said piston for cushioning the stopping of forward movement of said piston, and a projectible shaft, the rear end of said shaft having a centrally disposed rearwardly opening recess, the forward end of said shank being snugly received in said recess.

10. The combination of claim 9 wherein said shaft and said shank are of substantially the same cross sectional shape and area.

11. In combination, an elongated barrel member having a longitudinal bore formed therein opening through at least the forward muzzle end of said barrel member, a piston reciprocable in said bore, yieldable thrust means disposed in said bore rearwardly of said piston effecting a forward thrust on said piston, a centrally apertured abutment element secured in the forward end of said bore, a small diameter, centrally disposed and longitudinally extending shank projecting from the forward end of said piston snugly and slidably receivable through said apertured abutment element in fluid sealing engagement therewith whereby as said piston is moved forwardly in said bore the forward end of said shank will seal the forward end of said bore and subsequent further forward movement of said piston will effect compression of the atmosphere disposed between said abutment element and said piston for cushioning the stopping of forward movement of said piston, a projectible shaft, the rear end of said shaft having a centrally disposed rearwardly opening recess, the forward end of said shank being snugly received in said recess, at least one bridle member, means carried by said shaft attaching the front end of said bridle member thereto, and means securing the rear end of said bridle member to a portion of said spear gun.

12. The combination of claim 11 including means carried by the muzzle end of said gun releasably engaging and supporting the intermediate portion of said bridle member between the opposite ends thereof in a neat and coiled state.

13. The combination of claim 11 wherein said portion of said spear gun comprises an elongated buoyant member, said spear gun including means releasably securing said buoyant member thereto with the latter extending longitudinally of said spear gun and for disengagement with said spear gun upon a forward thrust being applied to said buoyant member, said buoyant member including a pair of depth controlling plane means movably mounted on its opposite end portions for movement about an axis generally paralleling the medial plane of said plane means, said plane means each including at least one laterally projecting arm means extending in a direction substantially at right angles to the medial plane of said plane means, said bridle member including a pair of bridle lines of equal effective length secured at their rear ends to the free end of said arm means whereby the buoyancy of said buoyant member and a pull on the forward ends of said bridle lines when said buoyant member is detached from said spear gun, will effect movement of said plane means to a position extending generally at right angles to the direction of movement of said lines and forward and upward movement of said buoyant member in the water.

14. For use with an underwater spear, at least one bridle member adapted to be secured to said spear, an elongated buoyant underwater drag member for tiring fish speared by said spear, said drag member including a pair of depth controlling plane means movably mounted on its opposite end portions for movement about an axis generally paralleling the medial plane of said plane means, said plane means each including at least one laterally projecting arm means extending in a direction substantially at right angles to the medial plane of said plane means, said bridle member including a pair of bridle lines of equal effective length secured to the free ends of said arm means whereby the buoyancy of said drag member and a pull on said front end of said bridle lines, when said drag member is detached from said spear gun, will effect movement of said plane means to a position extending at right angles to the direction of movement of said lines and forward and upward movement of said drag member in the water.

15. The combination of claim 11 wherein said portion of said spear gun comprises a buoyant member, and means releasably securing said buoyant member to said gun.

16. The combination of claim 15 including plane means coacting with said buoyant member and said bridle line for directing said buoyant member forwardly and upwardly in response to a forward and downward pull on said bridle line and directing said buoyant member forwardly and downwardly in response to a forward and upward pull on said bridle line.

17. The combination of claim 11 including a spear head assembly on the forward end of said shaft forwardly of said attaching means, said spear head assembly comprising a mounting disk slidably disposed on said shaft forwardly of said annular attaching means, an abutment head fixed on said shaft forwardly of said mounting disk, said disk having a plurality of generally radially extending slots formed therein communicating with the periphery of said disk, a plurality of elongated barbs having corresponding end portions pivotally secured in said slots for movement about axes extending transversely of said shaft and extending generally radially outwardly of said shaft, the inner ends of said barbs each having forward cam surfaces disposed in frictional engagement with the rear surface of said abutment head, and compression spring means disposed between said attaching means and said disk yieldably urging said disk forwardly along said shaft and said barbs toward forward limit positions with said barbs extending generally radially of said shaft and away from partially collapsed rearwardly and outwardly inclined positions.

18. A spear head assembly for the forward end of a spear shaft comprising a radially and outwardly projecting abutment shoulder on said shaft rearwardly of the forward end of said shaft, a mounting disk slidably disposed on said shaft forwardly of said annular shoulder, an abutment head fixed on said shaft forwardly of said mounting disk, said disk having a plurality of generally radially extending slots formed therein communicating with the periphery of said disk, a plurality of elongated barbs having corresponding end portions pivotally secured in said slots for movement about axes extending transversely of said shaft and extending generally radially outwardly of said shaft, the inner ends of said barbs each having forward cam surfaces disposed in frictional engagement with the rear surface of said abutment head, and compression spring means disposed between said annular shoulder and disk yieldably urging said disk forwardly along said shaft and said barbs toward forward limit positions with said barbs extending generally radially of said shaft and away from partially collapsed rearwardly and outwardly inclined positions.

19. The combination of claim 11 including a spearhead assembly on the forward end of said shaft forwardly of said attaching means, said attaching means comprising an attaching collar secured to said shaft and defining an impact weight for affording said spear shaft greater inertia when moving at high speed, an impact head assembly carried by the forward end of said shaft, said impact head assembly comprising a firing pin slide secured to the forward end of said shaft and including a centrally disposed and forwardly projecting firing pin, a mounting collar slidingly disposed on said slide for united reciprocal movement, and a barrel member removably secured to the forward end of said collar and disposed forwardly of and in longitudinal alignment with said firing pin slide, said barrel member and said mounting collar including coacting means adapted to removably secure a shotgun shell in said barrel with the primer of said shell aligned with said firing pin and disposed slightly forwardly of the forward end of said firing pin when in its rearmost position and adapted to be engaged by the latter upon movement of said firing pin slide forwardly toward its forwardmost position relative to said mounting collar.

20. The combination of claim 19 wherein said mounting collar and said firing pin slide include coacting friction means frictionally and releasably retaining said mounting collar in adjusted positions relative to said firing pin slide.

21. The combination of claim 20 wherein said mounting collar and said firing pin slide include coacting means for releasably retaining said firing pin slide in a rearmost position relative to said mounting collar.

22. For use with an underwater spear, a buoyant underwater drag member, adapted to be connected to said spear, for tiring fish speared by said spear, said drag member including depth controlling plane means movably mounted thereon for movement about an axis generally paralleling the medial plane of said plane means, said plane means including at least one laterally projecting arm means extending in a direction substantially at right angles to the medial plane of said plane means, the free ends of said arm means being adapted to be connected to a pull member whereby a pull on the end of the pull member remote from the drag member will effect movement of said plane means to a position extending at right angles to the direction of movement of the pull member, the forward pull on said pull member and its buoyancy then effecting forward and upward movement of said drag member in the water.

23. An underwater spear comprising an elongated shaft having a spearhead assembly on the forward end of said shaft, a collar secured to said shaft rearwardly of said spearhead assembly adapted to have one end of a line secured thereto and defining an impact weight for affording said spear shaft greater inertia when moving at high speed, said impact head assembly comprising a firing pin slide secured to the forward end of said shaft and including a centrally disposed and forwardly projecting firing pin, a mounting collar slidingly disposed on said slide for united reciprocal movement, a barrel member removably secured to the forward end of said collar and disposed forwardly of and in longitudinal alignment with said firing pin slide, said barrel member and said mounting collar including coacting means adapted to removably secure a shotgun shell in said barrel with the primer of said shell aligned with said firing pin and disposed slightly forward of the forward end of the firing pin when in its rearmost position and adapted to be engaged by the latter upon movement of said firing pin slide forwarding it toward its forwardmost position relative to said mounting collar.

References Cited in the file of this patent

UNITED STATES PATENTS

| | | |
|---|---|---|
| 1,334,206 | Woods | Mar. 16, 1920 |
| 1,472,223 | Loop | Oct. 30, 1923 |
| 1,727,812 | David | Sept. 10, 1929 |
| 2,087,445 | Price | July 20, 1937 |
| 2,289,284 | Chandler | July 7, 1942 |
| 2,859,970 | Doonan | Nov. 11, 1958 |
| 2,923,285 | Salles | Feb. 2, 1960 |
| 2,923,286 | Draganti | Feb. 2, 1960 |
| 2,993,697 | Urban | July 25, 1961 |